(12) United States Patent
Yeo et al.

(10) Patent No.: US 6,661,477 B2
(45) Date of Patent: Dec. 9, 2003

(54) TFT-LCD HAVING DUMMY GATE ELECTRODE AND DUMMY GATE INSULATOR

(75) Inventors: Ju Cheon Yeo, Kyongsangbuk-do (KR); Yong Min Ha, Kyongsangbuk-do (KR); Jae Deok Park, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 210 days.

(21) Appl. No.: 09/892,648

(22) Filed: Jun. 28, 2001

(65) Prior Publication Data

US 2002/0044231 A1 Apr. 18, 2002

(30) Foreign Application Priority Data

Aug. 29, 2000 (KR) ......................................... 2000-50429

(51) Int. Cl.$^7$ .............................. G02F 1/136; G02F 1/13
(52) U.S. Cl. ............................ 349/43; 349/46; 349/187
(58) Field of Search ............................ 349/43, 38, 139, 349/181, 46, 42; 257/59, 72

(56) References Cited

U.S. PATENT DOCUMENTS 5,737,041 A * 4/1998 Holmberg et al. ............ 349/43
6,163,356 A * 12/2000 Song et al. .................. 349/152
6,300,152 B1 * 10/2001 Kim ............................. 438/30

FOREIGN PATENT DOCUMENTS

KR 1019981079135 B1 11/1998
KR 1020000006579 B1 1/2000

* cited by examiner

Primary Examiner—Toan Ton
(74) Attorney, Agent, or Firm—McKenna Long & Aldridge LLP

(57) ABSTRACT

A liquid crystal display and a method for fabricating the same include a first substrate having an active layer with source/drain regions formed therein, a gate line and a data line extending in directions perpendicular to each other formed thereon, a dummy gate insulating film and a dummy gate electrode both formed on the first substrate in fixed patterns isolated from the gate line, an interlayer insulating film on the first substrate inclusive of the dummy gate electrode with a step, a drain electrode formed on the interlayer insulating film to overlap on upper regions of the dummy gate electrode so as to be in contact with the drain region and have a step to the data line, the data line formed on the interlayer insulating having a step to the drain electrode, a passivation film formed on the interlayer insulating film inclusive of the dummy gate electrode and the data line, a contact hole formed to expose the drain electrode overlapped with the dummy gate electrode, and a pixel electrode overlapping upper edges of the data line and in contact with the drain electrode through the contact hole, thereby reducing a vertical crosstalk while a large aperture is achieved, to improve the picture quality.

19 Claims, 8 Drawing Sheets

TFT-LCD HAVING DUMMY GATE ELECTRODE AND DUMMY GATE INSULATOR

CROSS REFERENCE TO RELATED APPLICATIONS

This application claims benefit of Korean Patent Application No. P2000-50429, filed on Aug. 29, 2000, the entirety of which is hereby incorporated by reference for all purposes as if fully set forth herein.

BACKGROUND OF THE INVENTION

1. Field of the Invention

The present invention relates to a liquid crystal display, and more particularly, to a liquid crystal display and a method for fabricating the same, which has large aperture and can improve a poor picture quality caused by vertical cross talk.

2. Background of the Related Art

A related art liquid crystal display is provided with a liquid crystal panel, a light source, and a driving circuit. The liquid crystal panel has first and second substrates, and liquid crystal injected between the two substrates. The second substrate has a black matrix, a color filter layer, and a common electrode.

The first substrate has a plurality of gate lines running in one direction at fixed intervals, a plurality of data lines running in one direction perpendicular to the gate lines at fixed intervals, and an LCD array at crossing parts of the gate lines and the data lines.

In an LCD array region, a space region between the gate lines and data lines is a pixel region, in which a pixel electrode and a thin film transistor are provided. That is, the thin film transistor is provided with a gate electrode connected to the gate line, a source electrode connected to the data line, a data electrode connected to the pixel electrode, for being turned on selectively in response to a signal to the gate line to transfer a data signal from the data line to the pixel electrode. The gate lines and the data lines are electrically connected to driving circuits.

Vertical cross-talk in the liquid crystal display, caused by parasitic capacitance Cds between the source electrode and the drain electrode, degrades a picture quality as a source voltage (a data signal) to be provided to the pixels on a vertical (data) line influences the liquid crystal pixel voltage. The cross-talk mostly occurs as a static capacitance between the data line and the pixel electrode is increased. Research has been performed with a goal to reduce the vertical cross-talk in a liquid crystal display with a large aperture. In order to achieve the large aperture, an organic insulating film is used as a passivation film deposited between the data line and the pixel electrode, and the pixel electrode is overlapped with and edge of the data line.

Figure 1:
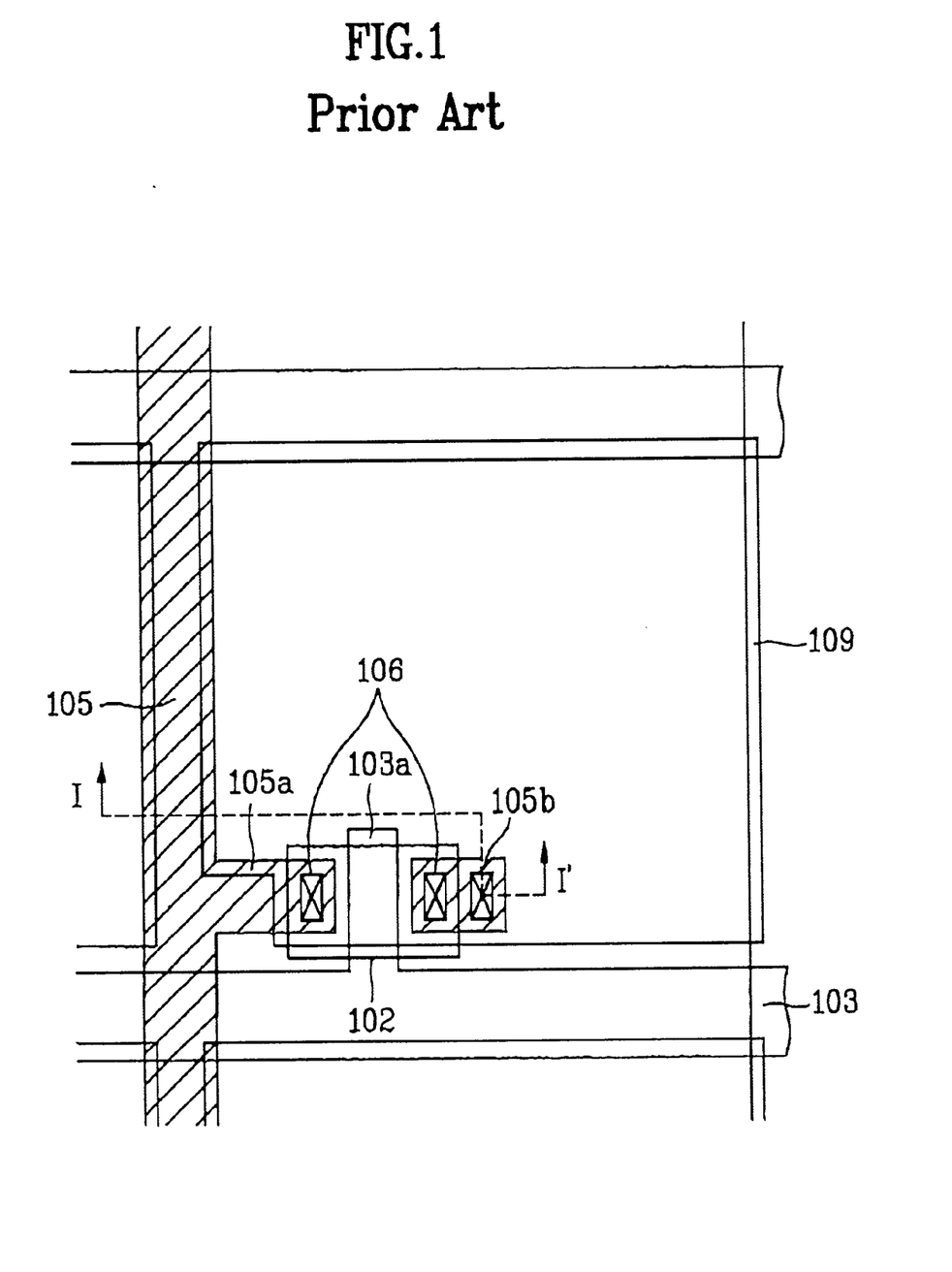
FIG. 1 illustrates a layout of a first substrate of a related art liquid crystal display.

A related art liquid crystal display and method for fabricating the same will be explained, with reference to the attached drawings. FIG. 1 illustrates a layout of a first substrate of the related art liquid crystal display, and FIG. 2 illustrates a section of the related art liquid crystal display across line I–I' in FIG. 1, showing a pixel electrode, a data line, and a drain electrode.

Figure 2:
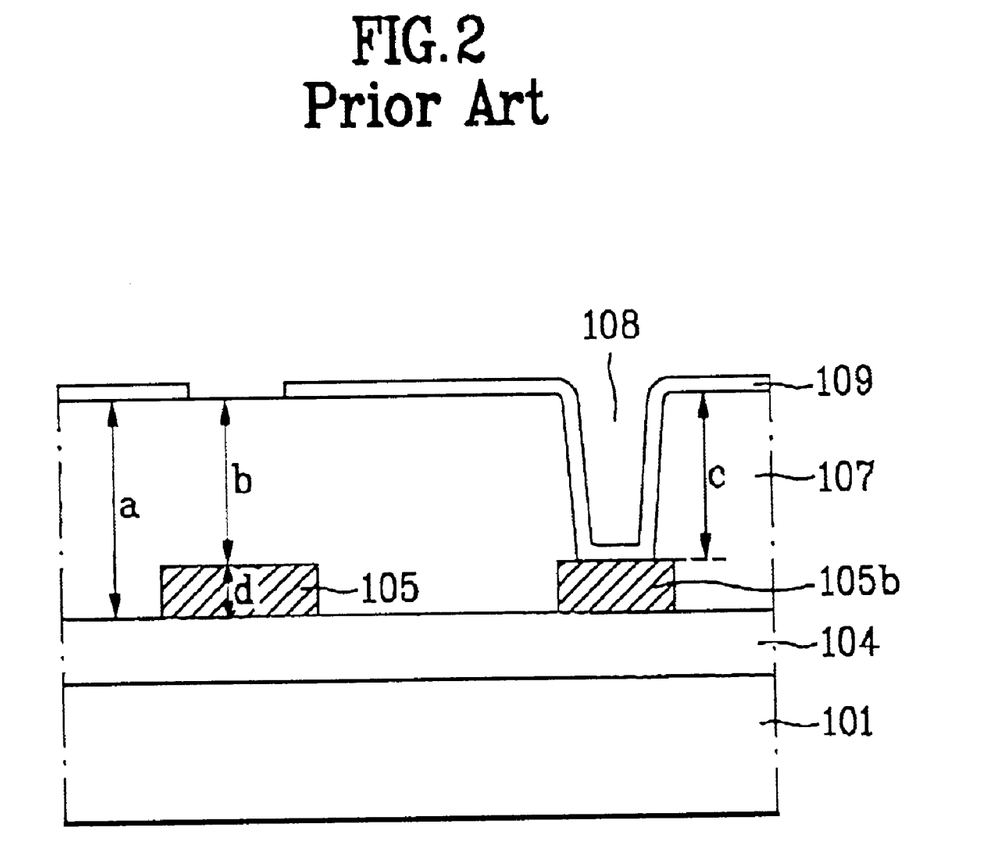
FIG. 2 illustrates a section of the related art liquid crystal display across line I–I' in FIG. 1, showing a pixel electrode, a data line, and a drain electrode.

Referring to FIGS. 1 and 2, the related art liquid crystal display is provided with an active layer 102, a channel layer of a thin film transistor in an active region defined on an insulating substrate 101, a gate insulating film (not shown) on the active layer 102 to surround the active layer 102, and a gate electrode 103a crossing a central part of the active layer 102 on the gate insulating film. The gate electrode 103a is a projection from the gate line 103 running in one direction. There are source/drain regions in the active layer on both sides of the gate electrode 103a, an interlayer insulating film 104 on an entire surface inclusive of the gate electrode 103a, and first contact holes 106 to expose the source/drain regions in the active layer 102 by etching the interlayer insulating film 104 and the gate insulating film. The source electrode 105a, the drain electrode 105b, and the data line 105 are formed at each of the contact holes 106 and on the interlayer insulating film 104. The data line 105 and the gate line 103 cross each other. An organic insulating film 107 is formed on the interlayer insulating film 104 inclusive of the source electrode 105a, the drain electrode 105b, and the dateline 105. The organic insulating film 107 has a flat surface. There is a second contact hole 108 in the organic insulating film 107 to expose the drain electrode 105b, and a pixel electrode 109 of ITO (Indium Thin Oxide) in the second contact hole 108 and on the organic insulating film 107. The pixel electrode 109 overlaps upper parts of edges of the data line 105, except the central part thereof.

Referring to FIG. 2, in a large aperture structure, a distance 'b' between the pixel electrode 109 and the data line 105 is the most important element in view of the vertical crosstalk. That is, the greater the distance 'b', the smaller the parasitic capacitance between the pixel electrode 109 and the data line 105, that improves the poor picture quality caused by the vertical crosstalk. However, the distance 'b' can not be made greater because an increased distance 'b' necessitates an increase of an etch depth 'c' of the second contact hole 108 provided for bringing the pixel electrode 109 into contact with the drain electrode 105. In conclusion, 'c' is fixed depending on a dry etching (anisotropic etching) capability, 'a' is fixed depending on 'c', and 'b' is fixed depending on 'c'. For an example, when 'c'=9500 Å, 'd'=3500 Å, 'a'=1.3 $\mu$m, and 'b'=0.95 $\mu$m. If 'b' is to be made thicker, then 'c' also has to be made thicker.

Figure 3A:
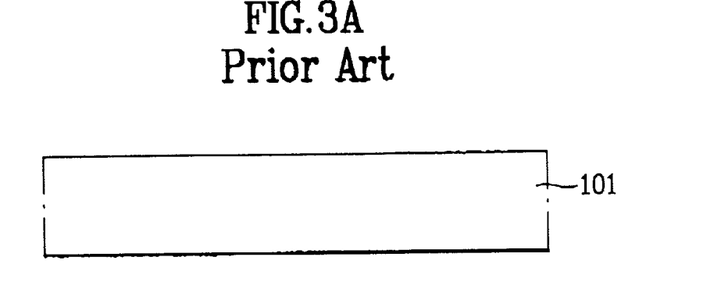
FIGS. 3A–3C illustrate sections showing the steps of a method for fabricating the related art liquid crystal display of FIG. 2.
Figure 3B:
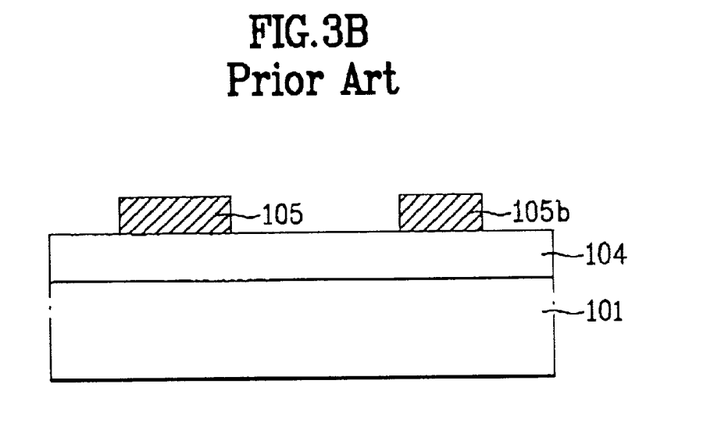
Figure 3C:
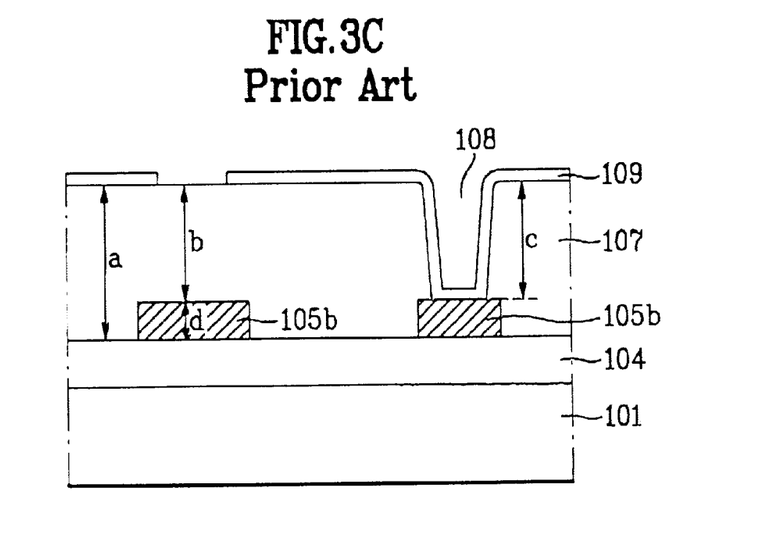

A method for fabricating the foregoing related art liquid crystal display will be explained. FIGS. 3A~3C illustrate sections showing the steps of a method for fabricating the related art liquid crystal display.

Referring to FIG. 3A, an active layer 102 (see FIG. 1) is formed on an active region defined on an insulating substrate 101, a gate insulating film (not shown) is formed on the active layer 102 to surround the active layer 102, and a gate line 103 (see FIG. 1) is formed on the gate insulating film to run in one direction, together with a gate electrode 103a (see FIG. 1) projected from the gate line 103 to cross a central part of the active layer 102. Source/drain regions are formed in the active layer on both sides of the gate electrode 103a.

Then, as shown in FIG. 3B, an interlayer insulating film 104 is deposited on an entire surface inclusive of the gate electrode 103a, and the interlayer insulating film 104 and the gate insulating film are etched to expose the source/drain regions in the active layer 102, to form a first contact hole 106 (see FIG. 1). A metal layer is formed in respective first contact holes 106 to the source and drain regions and on the interlayer insulating film 104, and subjected to anisotropic etching, to form a source electrode 105a (see FIG. 1) in contact with the source region, a drain electrode 105b in contact with the drain region, and a data line 105 extended from the source electrode to be in a perpendicular direction to the gate line 103.

As shown in FIG. 3C, an organic insulating film 107 is coated on an entire surface of the source electrode 105a, the data line 105, and the drain electrode 105b, and a second contact hole 108 is formed on the organic insulating film 107 to expose the drain electrode 105b. An ITO (Indium Tin Oxide) is deposited on an entire surface of the organic insulating film 107 inclusive of the second contact hole 108, and subjected to anisotropic etching to expose a central part of the data line 105, and overlaps upper part edges of the data line 105, to form a pixel electrode 109.

However, the foregoing related art liquid crystal display, and a method for fabricating the same, have the following problem.

The thicker organic insulating film formed between the data line and the pixel for reduction of a parasitic capacitance between the data line and the pixel electrode requires a longer time period in etching a second contact hole to bring the drain electrode and the pixel electrode into contact. Accordingly, the related art has a limitation in providing a liquid crystal display, which reduces a vertical crosstalk while a large aperture is achieved, for improving a picture quality.

SUMMARY OF THE INVENTION

Accordingly, the present invention is directed to a liquid crystal display and a method for fabricating the same that substantially obviates one or more of the problems due to limitations and disadvantages of the related art.

An object of the present invention is to provide a liquid crystal display and a method for fabricating the same, which can reduce a vertical crosstalk while a large aperture is achieved, for improving a picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes a first substrate having an active layer with source/drain regions formed therein, a gate line and a data line formed thereon extending in directions perpendicular to each other, a dummy gate insulating film and a dummy gate electrode both formed on the first substrate in fixed patterns isolated from the gate line, an interlayer insulating film on the first substrate inclusive of the dummy gate electrode with a step, a drain electrode formed on the interlayer insulating film to overlap on upper regions of the dummy gate electrode so as to be in contact with the drain region and have a step to the data line, the data line formed on the interlayer insulating film having a step to the drain electrode, a passivation film formed on the interlayer insulating film inclusive of the dummy gate electrode and the data line, a contact hole formed to expose the drain electrode overlapping the dummy gate electrode, and a pixel electrode overlapping upper edges of the data line and in contact with the drain electrode through the contact hole, thereby reducing a vertical crosstalk while a large aperture is achieved, to improve a picture quality.

In the other aspect of the present invention, there is provided a method for fabricating a liquid crystal display including a first substrate having an active layer with source/drain regions formed therein, and a gate line and a data line perpendicular to each other formed thereon, the method comprising the steps of (a) forming the gate line at the same time as forming a dummy gate insulating film and a dummy gate electrode both on the first substrate in fixed patterns isolated from the gate line, (b) forming an interlayer insulating film on the first substrate inclusive of the dummy gate electrode and the gate line so as to have a step, (c) forming the data line at the same time as forming a drain electrode on the interlayer insulating film to overlap on upper regions of the dummy gate electrode so as to be in contact with the drain region and have a step to the data line, (d) forming a passivation film on the interlayer insulating film inclusive of the dummy gate electrode and the data line, (e) forming a contact hole to expose the drain electrode overlapped with the dummy gate electrode, and (f) forming a pixel electrode on the passivation film to overlap upper edges of the data line and to be in contact with the drain electrode through the contact hole.

The present invention reduces a capacitance between the pixel electrode and the data line for reducing a vertical crosstalk, by forming an organic insulating film between the pixel electrode and the data line while a contact hole forming time period for providing a contact between the pixel electrode and the drain electrode is not increased because the thickness of the insulating film where the contact hole is formed is not increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 4:
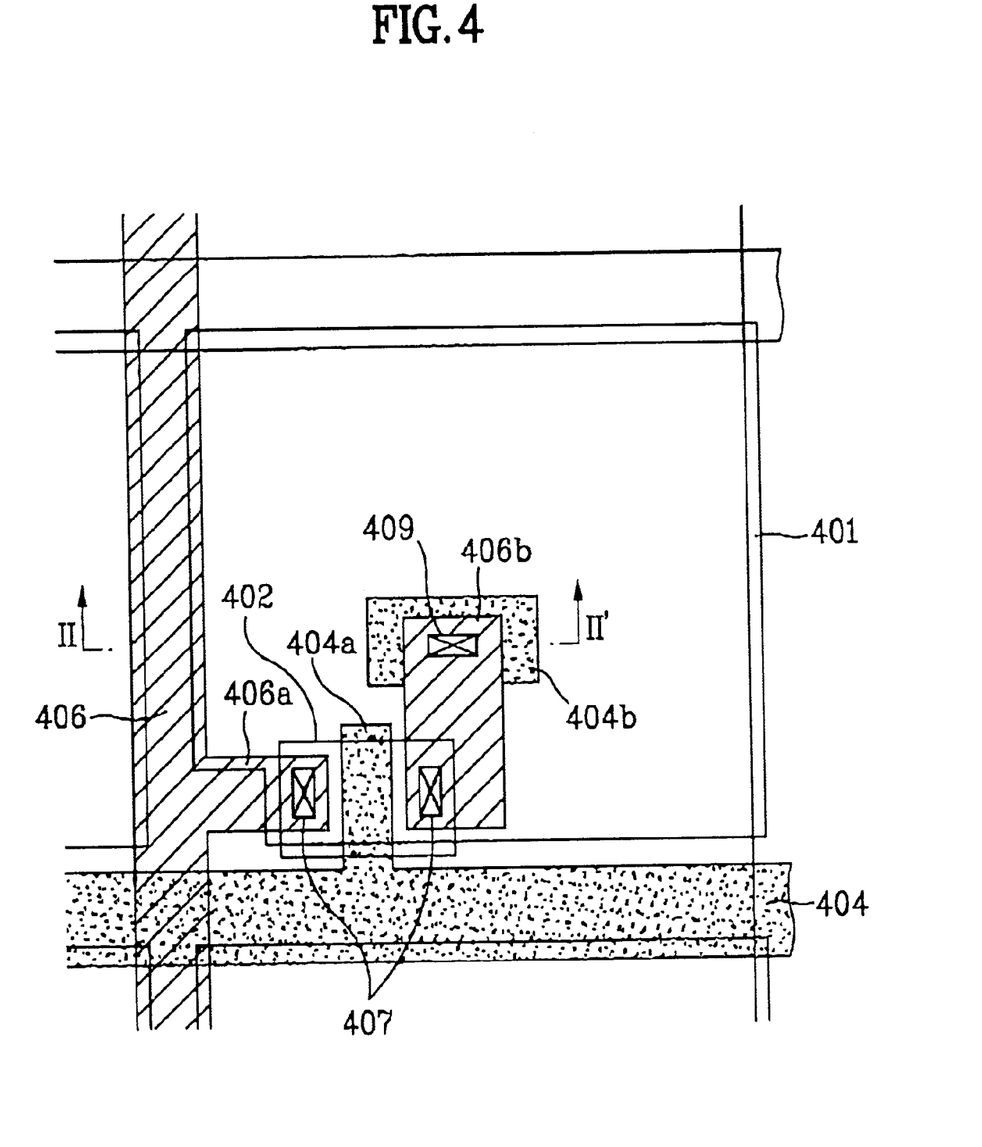
FIG. 4 illustrates a layout of a first substrate of a liquid crystal display in accordance with a preferred embodiment of the present invention.

Reference will now be made in detail to the preferred embodiments of the present invention, examples of which are illustrated in the accompanying drawings. FIG. 4 illustrates a layout of a first substrate of a liquid crystal display in accordance with a first preferred embodiment of the present invention, and FIG. 5 illustrates a section of the liquid crystal display across line II–II' in FIG. 4, showing a pixel electrode, a data line, and a drain electrode in accordance with a first preferred embodiment of the present invention.

Figure 5:
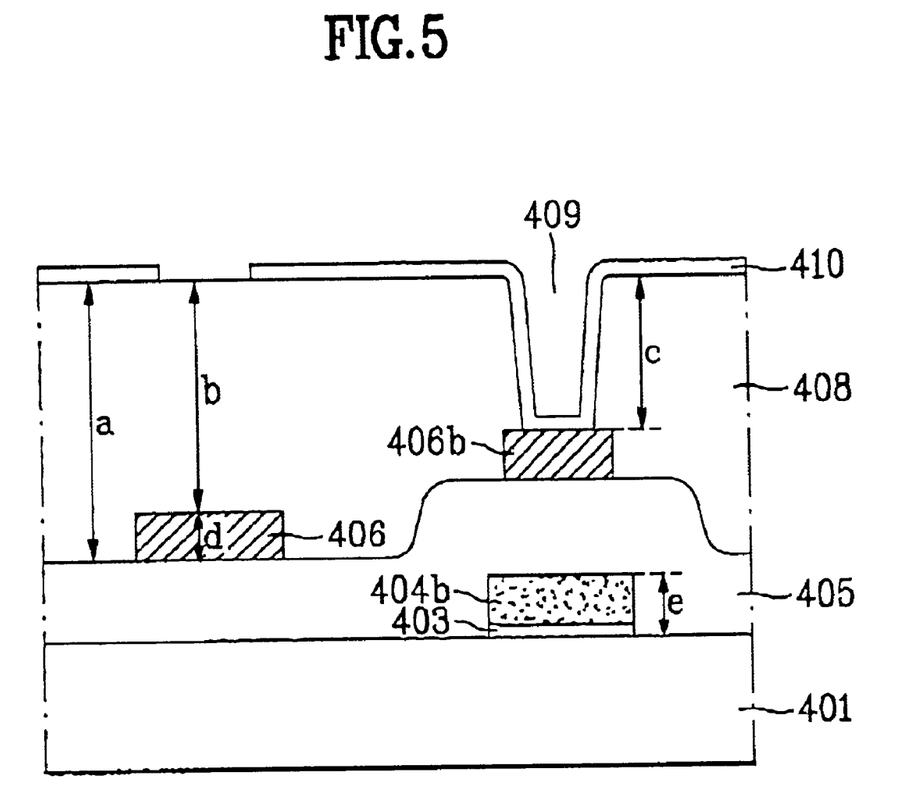
FIG. 5 illustrates a section of the liquid crystal display across line II–II' in FIG. 4, showing a pixel electrode, a data line, and a drain electrode in accordance with a first preferred embodiment of the present invention.

Referring to FIGS. 4–5, the first embodiment liquid crystal display of the present invention includes an active layer 402 formed on an active region defined on an insulating film 402, a gate insulating film (not shown) on the active layer 402 to surround the active layer 402, and a gate electrode 404a to cross a central part of the active layer 402 on the gate insulating film. There are source/drain regions in the active layer on both sides of the gate electrode 404a. The gate electrode 404a is projected from the gate line 404 running in one direction. When the gate insulating film and the gate electrode 404a are formed thus, there are a dummy gate insulating film 403 and a dummy gate electrode 404b on a region of the insulating substrate 401 to overlap with one side of a lower part of the drain electrode 406b to be formed later. The dummy gate electrode 404b has a width greater than the drain electrode 406b. There is an interlayer insulating film 405 deposited on an entire surface inclusive of the gate electrode 404a and the dummy gate electrode 404b, and first contact holes 407 in the interlayer insulating film 405 and the gate insulating film to expose the source/drain regions in the active layer 402, respectively. There are a source electrode 406a, a drain electrode 406b, and a data line 406 in the first contact holes 407 to respective source region and drain region and on the interlayer insulating film 405. The data line 406 and the drain electrode 406b form a step owing to the dummy gate insulating film 403 and the dummy gate 404b. There is an organic insulating film 408 on the interlayer insulating film 405 inclusive of the source electrode 406a and the drain electrode 406b. The organic insulating film 408 has a flat surface. There is a second contact hole 409 in the organic insulating film 408 to expose a top of the drain electrode 406b overlapped with the dummy gate electrode 404a, and a pixel electrode 410 of a transparent conductive material (e.g., ITO) in the second contact hole 409 and on the organic insulating film 408. The pixel electrode 410 is overlapped with the data line 406 at upper edges except a central part thereof.

As shown in FIG. 5, in the large aperture structure, a distance 'b' between the pixel electrode 410 and the data line 406 is the most important parameter in view of a picture quality. That is, the thicker the 'b', the smaller the capacitance between the pixel electrode 410 and the data line 406, to reduce deterioration of picture quality caused by vertical crosstalk.

Thus, in the first embodiment of the present invention, because the dummy gate insulating film 403 and the dummy gate electrode 404a are overlapped with one side of the drain electrode 406b, and the second contact hole 409 is to be formed thereto, the thickness of the organic insulating film 408 over the data line 406 overlapped with the pixel electrode 410 at an edge thereof is formed thicker than the related art, while the thickness of the part of the organic insulating film 408 to be etched for forming the second contact hole 409 is maintained. For an example, when 'c' is 9500 Å, and 'd' is 3500 Å, if 'e', a total thickness of the dummy gate insulating film 403 and the dummy gate electrode 404b, is 4800 Å, 'a' becomes 1.78 μm, and 'b' becomes 1.43 μm, which is approx. 50.5% increase of thickness compared to the 'b'-0.95 μm in the related art.

Figure 7:
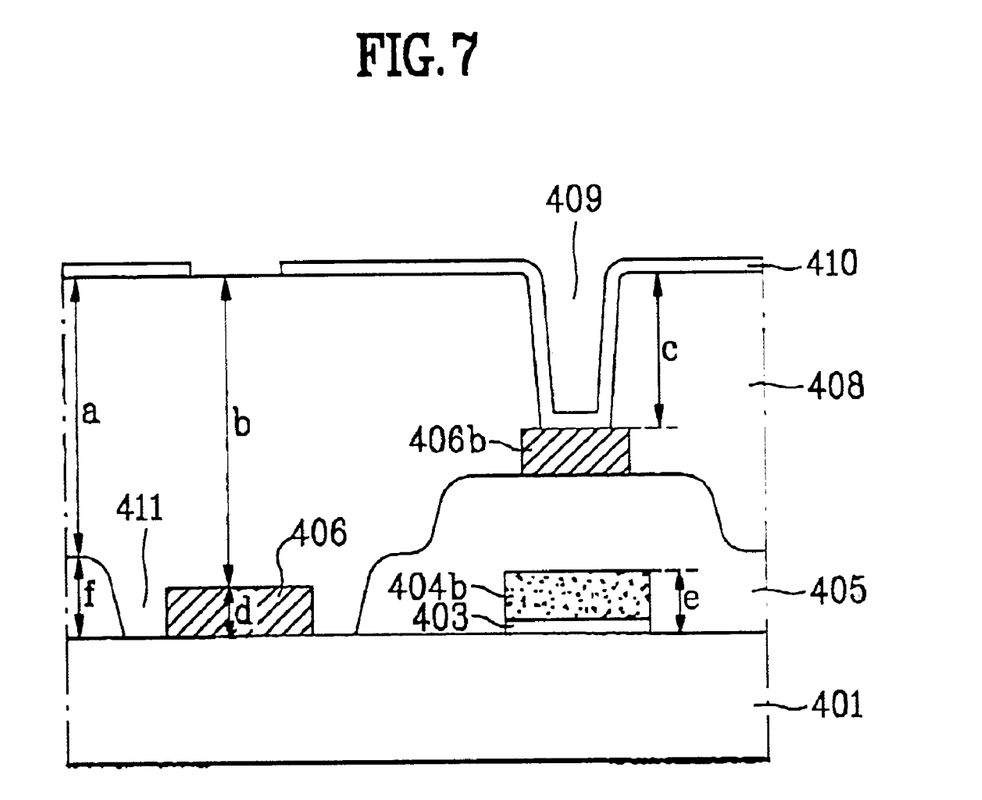
FIG. 7 illustrates a section of the liquid crystal display across line II–II' in FIG. 4, showing a pixel electrode, a data line, and a drain electrode in accordance with a second preferred embodiment of the present invention; and, FIGS. 8A–8C illustrate sections showing the steps of a method for fabricating a liquid crystal display in accordance with a second preferred embodiment of the invention.

Next, a liquid crystal display in accordance with a second preferred embodiment of the present invention will be explained. FIG. 7 illustrates a section of the liquid crystal display across line II–II' in FIG. 4, showing a pixel electrode, a data line, and a drain electrode in accordance with a second preferred embodiment of the present invention.

Referring to FIGS. 4 and 7, the liquid crystal display in accordance with a second preferred embodiment of the present invention includes an active layer 402 in an active region defined on an insulating substrate 401, a gate insulating film (not shown) on the active layer 402 to surround the active layer 402, and a gate electrode 404a (see FIG. 4) to cross a central part of the active layer 402 on the gate insulating film. There are source/drain regions in the active layer 402 on both sides of the gate electrode 404a. The gate electrode 404a is projected from the gate line 404 (see FIG. 4) running in one direction. There are a dummy gate insulating film 403 and a dummy gate electrode 404b on a region of the insulating substrate 401 beneath one side of the drain electrode 406b. The dummy gate electrode 404b has a width larger than a width of the drain electrode 406. There are an interlayer insulating film 405 on an entire surface inclusive of the gate electrode 404 and the dummy gate electrode 404b, and contact holes 407 in the interlayer insulating film 405 and the gate insulating film (not shown) to expose the source/drain regions in the active layer 402. When the first contact hole 407 is etched, the interlayer insulating film 405 is also etched to form a channel or hole 411 exposing the insulating substrate 401 where the data line 406 is to be formed. The channel 411 of the interlayer insulating film 405 is etched to a width larger than a width of the data line 406. The source electrode 406a, the drain electrode 406b, and the data line 406 are formed in the contact holes 407 to the source region and the drain region, and the channel 411 of the interlayer insulating film 405, respectively. The data line 406 is formed on the insulating substrate 401 in the channel 411 having the interlayer insulating film 405 removed therefrom. The data line 406 and the drain electrode 406b form a step owing to the interlayer insulating film 405 etched at the time of formation of the dummy gate insulating film 403, the dummy gate electrode 404b, and the first contact hole 407. There is an organic insulating film 408 deposited on the interlayer insulating film 405 inclusive of the source electrode 406a, the drain electrode 406b, and the data line 406. In this instance, the organic insulating film 408 has a flat surface, the second contact hole 409 is formed in the organic insulating film to expose the drain electrode 406b, and there is the pixel electrode 410 of a transparent conductive material (e.g., ITO) in the second contact hole 409 and on the organic insulating film 408. The pixel electrode 410 is overlapped on an upper part of edges of the data line 406 except a central portion thereof.

Thus, in the second embodiment of the present invention, for formation of a thicker organic insulating film 408 between the pixel electrode 410 and the data line 406, the dummy gate insulating film 403 and the dummy gate electrode 404b are formed under a region the second contact hole 409 is formed thereto, and the data line 406 is buried in a channel 411 in the interlayer insulating film 405 etched during formation of the first contact hole 407. The thickness of the organic insulating film 408 over an upper part of the data line 406 is increased, while the thickness of the second contact hole 409 to be etched is not increased, thus reducing the capacitance Cdp between the data line 406 and the pixel electrode 410. For an example, in similarity to the related art example, if 'c' is 9500 Å, and 'd' is 3500 Å, a total thickness of the dummy gate insulating film 403 and the dummy gate electrode 404b 'e' is 4800 Å, and a thickness 'f' of the interlayer insulating film 405 is 6000 Å, 'a' is 1.78 µm, and 'b' is 2.03 µm. The 2.03 µm thickness of 'b' is an increase of 114% in thickness compared to the 0.95 µm thickness of 'b' in the related art.

Figure 6A:
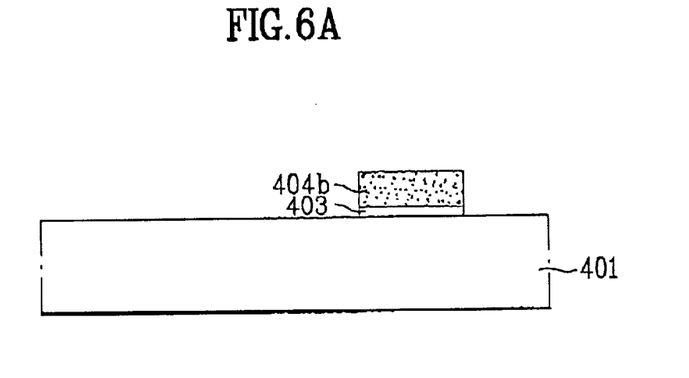
FIGS. 6A–6C illustrate sections showing the steps of a method for fabricating a liquid crystal display in accordance with a first preferred embodiment of the invention.
Figure 6B:
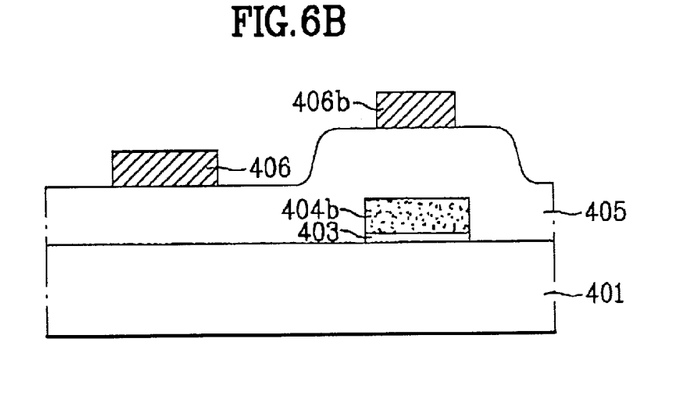
Figure 6C:
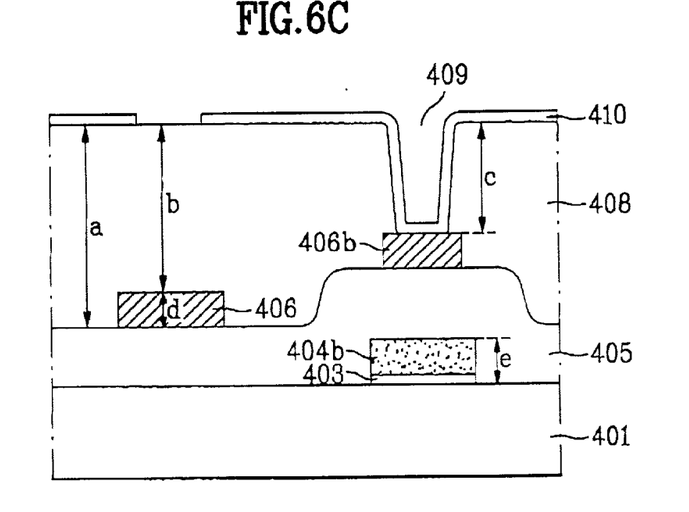
Figure 8A:
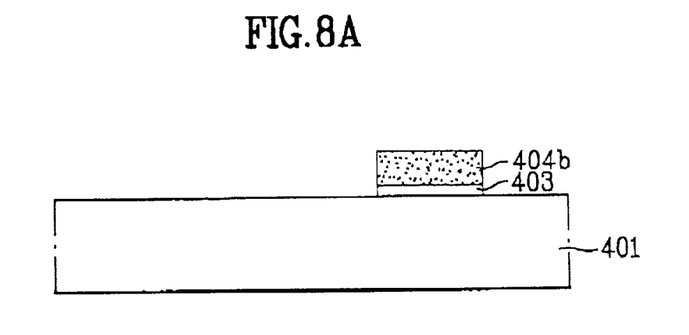
Figure 8B:
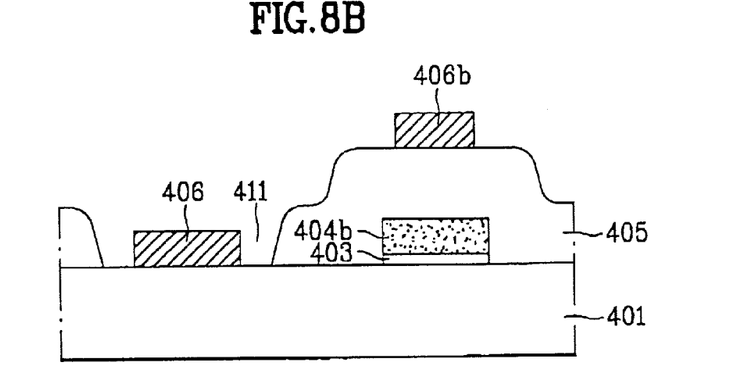
Figure 8C:
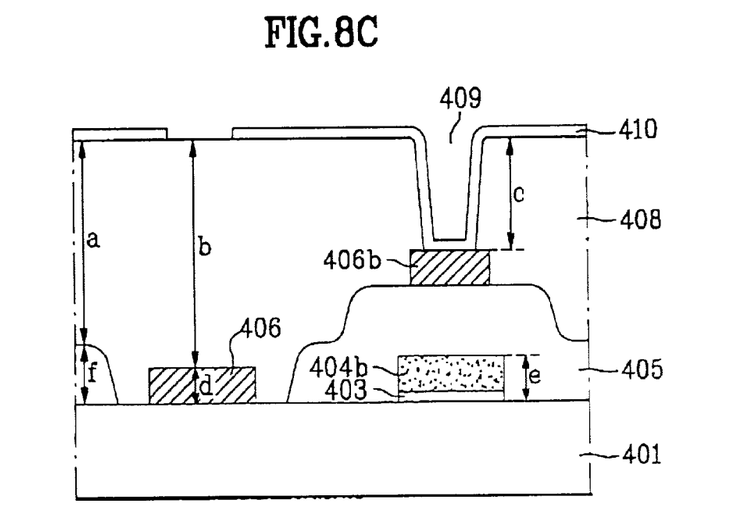

A method for fabricating a foregoing liquid crystal display of the present invention will be explained. FIGS. 6A–6C illustrate sections showing the steps of a method for fabricating a liquid crystal display in accordance with a first preferred embodiment of the invention, and FIGS. 8A–8C illustrate sections showing the steps of a method for fabricating a liquid crystal display in accordance with a second preferred embodiment of the invention.

In the method for fabricating a liquid crystal display in accordance with a first preferred embodiment of the invention, though not shown in the drawings, an amorphous silicon layer (not shown) is deposited on an insulating substrate 401 having an active region defined thereon, and etched by photo etching to form an active layer 402 on the active region. A gate insulating film (not shown) is formed to surround the active layer 402. Next, a conductive material (e.g., a metal) is deposited (e.g., sputtered) on the gate insulating film, and patterned, to form a gate electrode 404a and the gate line 404. In the formation of the gate insulating film, the gate electrode, and the gate line, as shown in FIG. 6A, a dummy gate insulating film 403 and a dummy gate electrode 404b are also formed on the insulating substrate 401 beneath an area where one side of a drain electrode (see FIG. 6B) will be formed later. Then, though not shown, impurity ions are injected into the active layer 402 on both sides of the gate electrode 404a by using the gate electrode 404a as a mask, to form source/drain regions.

Next, as shown in FIG. 6B, an interlayer insulating film 405 is deposited on an entire surface of the insulating substrate 401 inclusive of the gate electrode 404a and the dummy gate electrode 404b. Then, though not shown, the interlayer insulating film 405 and the gate insulating film (not shown) are subjected to anisotropic etching until the source/drain regions are exposed, to form first contact holes 407 in the source/drain regions. A conductive material (e.g., metal) layer is deposited on the interlayer insulating film 405, and subjected to anisotropic etching, to form a source electrode (not shown) in the first contact hole 407 in the source region, and a data line 406 on the interlayer insulating film 405 adjacent to the source electrode perpendicular to the gate line 404. There is a drain electrode 406b formed in the drain region spaced from the source electrode.

Next, as shown in FIG. 6C, an organic insulating film 408 is coated on an entire surface of the interlayer insulating film 405 inclusive of the source electrode, drain electrode 406b, and the data line 406, and subjected to anisotropic etching until a top of the drain electrode 406b overlapped with the dummy gate electrode 404b is exposed, to form a second contact hole 409. Then, a transparent conductive (e.g., ITO) film is deposited on an entire surface of the organic insulating film inclusive of the second contact hole 409, and subjected to anisotropic etching to overlap with upper edges of the dateline 406 except a central part, to form a pixel electrode 410. Thus, by forming the dummy gate insulating film 403 and the dummy gate electrode 404b under the second contact hole 409 to be formed, a thickness of the organic insulating film 408 between the data line 406 and the pixel electrode 410 is increased while a thickness of the organic insulating film 408 where the second contact hole 409 is to be formed is not increased.

A method for fabricating a liquid crystal display in accordance with a second preferred embodiment of the present invention will be explained. Since the second embodiment method is the same with the first embodiment method up to formation of the dummy gate insulating film and the dummy gate electrode 404b in FIG. 6A of the first embodiment, the second embodiment method will be explained from deposition of an interlayer insulating film 405.

As shown in FIG. 8B, an interlayer insulating film 405 is deposited on an entire surface of the insulating substrate 401 inclusive of the gate electrode 404a and the dummy gate electrode 404b. Though not shown, the interlayer insulating film 405 and the gate insulating film are subjected to anisotropic etching until the source/drain regions are exposed, to form first contact holes in the source/drain regions. When the first contact holes are thus formed, a part of the interlayer insulating film 405 is etched in one direction at a time until a channel 411 is formed in the insulating film 405 and a portion of the insulating substrate 401 is exposed where a data line 406 is to be formed. The insulating substrate 401 is etched to a width larger than a width of the data line 406 to be formed, later. Then, a conductive material (e.g., metal) layer is deposited on the interlayer insulating film 405, inclusive of the exposed insulating substrate 401, and subjected to anisotropic etching to form a source electrode (FIG. 4) in the first contact hole in the source region, and the data line 406 on the part of the insulating substrate 401 exposed as the interlayer insulating film 405 is etched to be in contact with the source electrode and perpendicular to the direction of the gate line. There is a drain electrode 406b in the drain region spaced apart from the source electrode.

Next, as shown in FIG. 8C, an organic insulating film 408 is coated on an entire surface of the interlayer insulating film 405 inclusive of the source electrode and the drain electrode 406b, and the data line 406. The organic insulating film 408 over the drain electrode 406b is subjected to anisotropic etching until a top of the drain electrode 406b over the dummy gate electrode 404b is exposed, to form a second contact hole 409. A transparent conductive (e.g., ITO) film is deposited on an entire surface of the organic insulating film 408 inclusive of the second contact hole 409, and subjected to anisotropic etching to overlap with upper edges of the data line 406 except a central part of the data line 406, to form a pixel electrode 410. Thus, by stacking the dummy gate insulating film 403 and the dummy gate electrode 404b beneath the drain electrode 406b, the second contact hole is to be formed thereto at one side of a lower part thereof, and forming the data line on the insulating substrate 401 to be buried in a hole in the interlayer insulating film 405, a thickness of the organic insulating film 408 between the data line 406 and the pixel electrode 410 is increased.

As has been explained, the liquid crystal display and the method for fabricating the same have the following advantages.

In the formation of the pixel electrode to overlap with edge parts of the data line for providing a large aperture, by increasing the thickness of the organic insulating film between the data line and the pixel electrode the parasitic capacitance between the data line and the pixel electrode can be reduced, which in turn reduces vertical crosstalk, preventing a picture quality from becoming poor.

It will be apparent to those skilled in the art that various modifications and variations can be made in the liquid crystal display and the method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display including a first substrate having an active layer with source/drain regions formed therein, and a gate line and a data line formed thereon extending in directions perpendicular to each other, the liquid crystal display comprising:

a dummy gate insulating film and a dummy gate electrode both formed on the first substrate in fixed patterns isolated from the gate line;

an interlayer insulating film on the first substrate inclusive of the dummy gate electrode, a drain electrode formed on the interlayer insulating film so as to be in contact with the drain region, to have a step to the data line, and to overlap a portion of the dummy gate electrode;

a passivation film formed on the interlayer insulating film inclusive of the dummy gate electrode and the data line;

a contact hole formed to expose the drain electrode overlapping the dummy gate electrode; and, a pixel electrode overlapping upper edges of the data line and in contact with the drain electrode through the contact hole.

2. A liquid crystal display as claimed in claim 1, wherein a position of the drain electrode where the contact hole is formed is higher than a position where the data line is formed.

3. A liquid crystal display as claimed in claim 1, wherein a first thickness of the passivation film over the drain electrode where the contact hole is formed is less than a second thickness of the passivation film over the data line.

4. A liquid crystal display as claimed in claim 1, further comprising a source electrode projected from the data line to be in contact with the source region.

5. A liquid crystal display including a first substrate having an active layer with source/drain regions formed therein, and a gate line and a data line formed thereon extending in directions perpendicular to each other, the liquid crystal display comprising:

a dummy gate insulating film and a dummy gate electrode both formed on the first substrate in fixed patterns isolated from the gate line;

an interlayer insulating film on the first substrate inclusive of the dummy gate electrode and exposing a part of the first substrate where the data line is formed;

a drain electrode formed on the interlayer insulating film electrode so as to be in contact with the drain region, to have a step to the data line, and to overlap a portion of the dummy gate;

a passivation film formed on the interlayer insulating film inclusive of the dummy gate electrode and the data line;

a contact hole formed to expose the drain electrode overlapping the dummy gate electrode; and, a pixel electrode overlapping upper edges of the data line and in contact with the drain electrode through the contact hole.

6. A liquid crystal display as claimed in claim 5, wherein a position of the drain electrode where the contact hole is formed is higher than a position where the data line is formed.

7. A liquid crystal display as claimed in claim 5, wherein a first thickness of the passivation film over the drain electrode where the contact hole is formed is less than a second thickness of the passivation film over the data line.

8. A liquid crystal display as claimed in claim 5, further comprising a source electrode projected from the data line to be in contact with the source region.

9. A method for fabricating a liquid crystal display including a first substrate having an active layer with source/drain regions formed therein, and a gate line and a data line extending in directions perpendicular to each other formed thereon, the method comprising:

(a) forming the gate line at a same time while forming a dummy gate insulating film and a dummy gate electrode both on the first substrate in fixed patterns isolated from the gate line;

(b) forming an interlayer insulating film on the first substrate inclusive of the dummy gate electrode and the gate line so as to have a step;

(c) forming the data line at a same time while forming a drain electrode on the interlayer insulating film so as to be in contact with the drain region, to have a step to the data line, and to overlap a portion of the dummy gate electrode;

(d) forming a passivation film on the interlayer insulating film inclusive of the dummy gate electrode and the data line;

(e) forming a contact hole to expose the drain electrode overlapping with the dummy gate electrode; and, (f) forming a pixel electrode on the passivation film to be overlapped on upper edges of the data line and in contact with the drain electrode through the contact hole.

10. A method as claimed in claim 9, wherein the dummy gate electrode has a width larger than a width of the drain electrode.

11. A method as claimed in claim 9, wherein the passivation film has a first thickness over the data line which is greater than a second thickness of the passivation film over the drain electrode where the contact hole is formed.

12. A method as claimed in claim 9, wherein the pixel electrode is formed of indium-tin-oxide (ITO).

13. A method as claimed in claim 9, wherein an upper surface of the passivation film is substantially flat.

14. A method for fabricating a liquid crystal display including a first substrate having an active layer with source/drain regions formed therein, and a gate line and a data line extending in directions perpendicular to each other formed thereon, the method comprising:

(a) forming the gate line at a same time while forming a dummy gate insulating film and a dummy gate electrode both on the first substrate in fixed patterns isolated from the gate line;

(b) forming an interlayer insulating film on the first substrate inclusive of the dummy gate electrode and the gate line to expose a portion of the first substrate where the data line is formed;

(c) forming the data line on the exposed portion of the first substrate at a same time while forming a drain electrode on the interlayer insulating film so as to be in contact with the drain region, to have a step to the data line, and to overlap a portion of the dummy gate electrode;

(d) forming a passivation film on the interlayer insulating film inclusive of the dummy gate electrode and the data line;

(e) forming a contact hole to expose the drain electrode overlapping the dummy gate electrode; and, (f) forming a pixel electrode on the passivation film to be overlapped on upper edges of the data line and in contact with the drain electrode through the contact hole.

15. A method as claimed in claim 14, wherein the dummy gate electrode has a width larger than a width of the drain electrode.

16. A method as claimed in claim 14, wherein the passivation film has a first thickness over the data line which is greater than a second thickness of the passivation film over the drain electrode where the contact hole is formed.

17. A method as claimed in claim 14, wherein the pixel electrode is formed of indium-tin-oxide (ITO).

18. A method as claimed in claim 14, wherein an upper surface of the passivation film is substantially flat.

19. A method as claimed in claim 14, wherein a width of the exposed portion of the first substrate is greater than a width of the data line.

* * * * *